United States Patent Office 3,453,813
Patented July 8, 1969

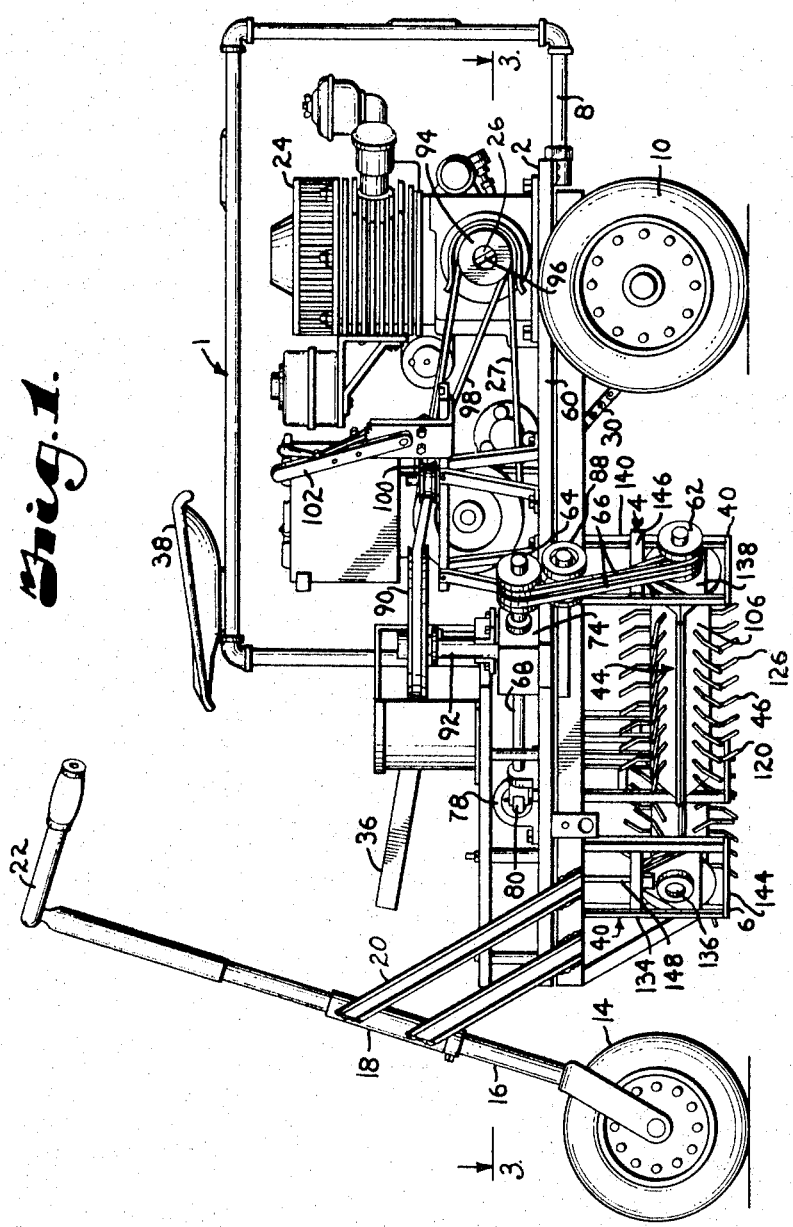

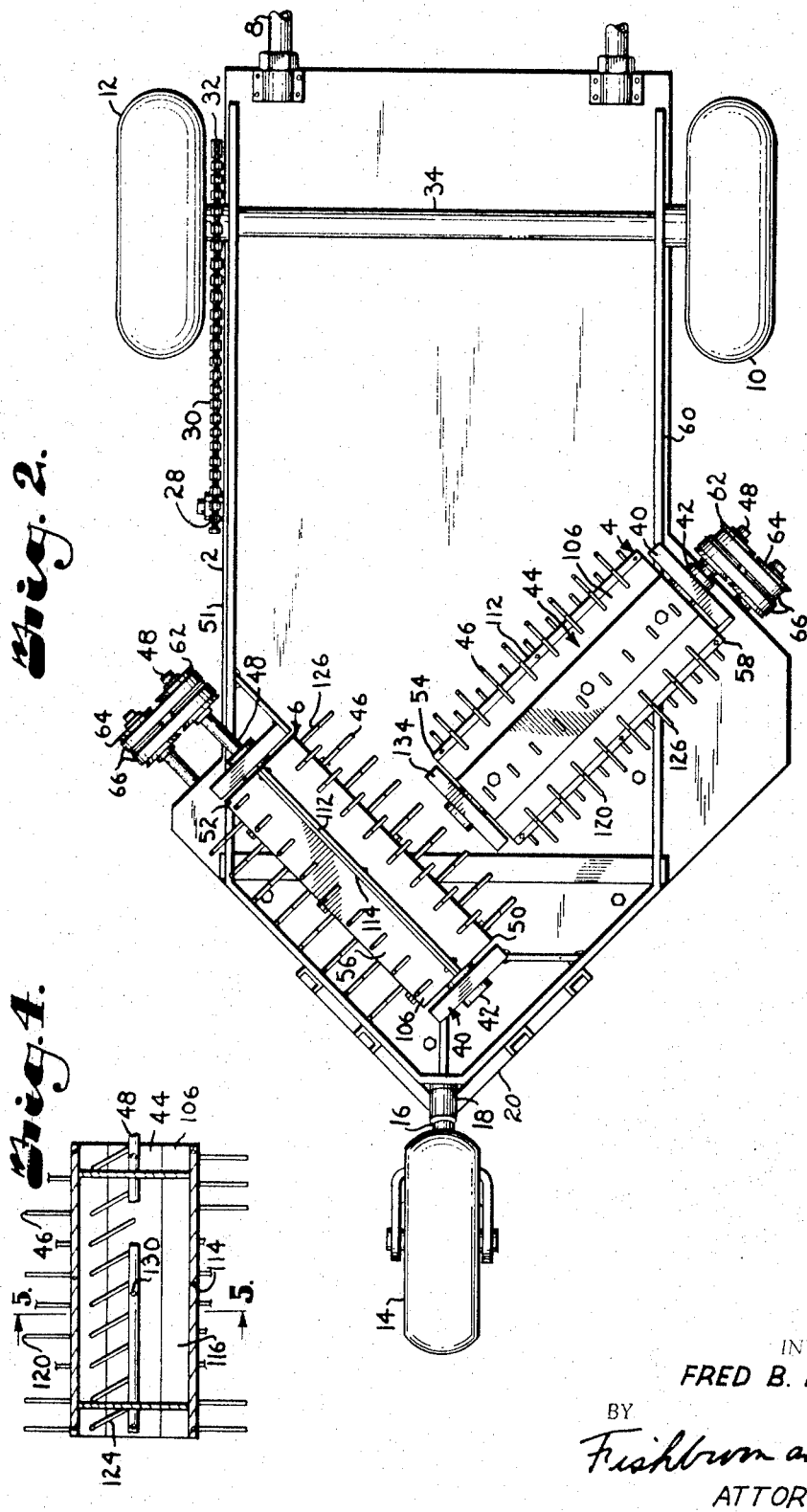

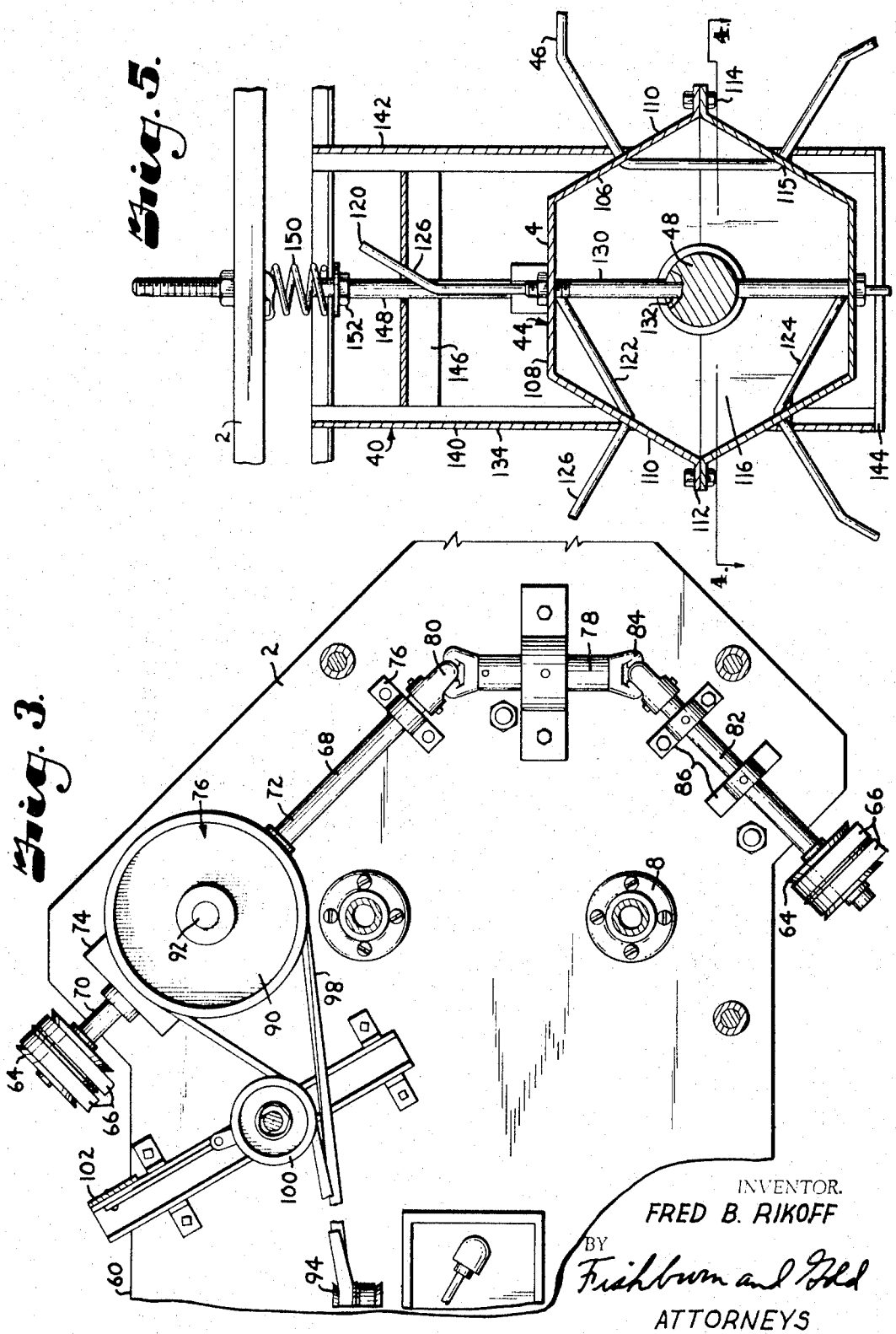

---

3,453,813
GROUNDS MAINTENANCE APPARATUS
Fred B. Rikoff, R.R. 1, Colby, Kans. 67701
Filed Aug. 29, 1966, Ser. No. 575,618
Int. Cl. A01d 51/00
U.S. Cl. 56—27                          3 Claims

ABSTRACT OF THE DISCLOSURE

A mobile ground maintenance apparatus having a frame with one end portion supported by spaced traction wheels and the other end portion supported by a steered wheel. Power mechanism is mounted on the frame generally in the area above the traction wheels. Raking or sweeping mechanism is carried on the frame between the traction wheels and steered wheel and includes elongate rotatable carriers rotatably supported under the frame with a plurality of longitudinally spaced projection tines that are bent rearwardly of the direction of rotation. The carriers are rotatably mounted with their axes oblique to the path of the apparatus with the forward end portion of one in the center portion of the path with the carrier extending toward one side and the forward portion of the other in the center portion of the path rearwardly of the first carrier and extending toward the other side of the frame whereby in operation the carriers are rotated as the apparatus moves along a path to sweep material laterally from the path.

---

This invention relates to an apparatus for maintenance or care of grounds and the like and more particularly, to a new and improved apparatus for raking or sweeping of material into a windrow for ultimate gathering or disposal.

It is desirable for the removal of thatch, trash or other debris from lawns and the like or the removal of snow or other material from various surfaces to effectively concentrate the material in windrows for ease of gathering and disposal without damage to living plants such as grass or to the surfaces from which the material is removed. In an apparatus of this nature, for residential and other uses, it is particularly important that the unit be compact and easily maneuverable for utilization on lawns and other restricted irregular areas while maintaining a relatively large cleaning or raking area with preventing contamination of previously cleaned areas by additional cleaning action.

The principal objects of this invention are: to provide a new and improved apparatus for raking or sweeping operations of a compact easily maneuverable construction; to provide such an apparatus having a carriage means for movement along selected paths with a pair of raking or sweeping means operatively connected to said carriage means and obliquely oriented relative to said path to remove material from said path with said raking or sweeping means being reversely oriented relative to one another whereby material will be moved laterally to both sides of said apparatus, said raking or sweeping means being disposed for removal from overlapping portions of said path to effectively clean a complete swath across an area with a single pass without the use of a single raking means which cause movement for some of the material over a longer distance to the windrow thereby decreasing efficiency; to provide such an apparatus which forms a windrow on each side of a cleaned or raked area to protect the area from contamination from additional cleaning or raking operations such that debris or other material is not thrown into the cleaned area; to provide such an apparatus wherein the raking or sweeping means is located beneath a carriage means to provide a compact unit; to provide such an apparatus having self-cleaning tines on each of said raking or sweeping means of a new and novel construction; to provide such an apparatus having raking or sweeping means comprised of rotatable carriers having a plurality of radially extending tines operatively connected thereto, said tines having end portions bent in a reverse direction to that of the direction of rotation of said rollers thereby effecting a raking or cleaning operation without damage to the surface being raked or cleaned and resulting in a self-cleaning, raking or sweeping means to eliminate stoppages due to the tendency of various materials to entangle themselves on conventional prior art tines; to provide such an apparatus wherein the tines tend to pass through grass or growing plants for the removal of thatch or the like without digging out the grass or plants or otherwise damaging said plants; to provide a new and improved carrier tine structure employing generally U-shaped members having a pair of leg portions defining tines with a cross portion disposed within a cylindrical roller member to form a strong durable efficient roller tine structure; to provide such an apparatus wherein the carriage structure moves in a first direction and the tines of the raking means move across the surface being cleaned or raked in a direction oblique to said first direction effecting a forward raking or cleaning action in a lateral direction of the carriage whereby the bent portion of said tines slides laterally across the surface to effectively clean said surface; to provide such an apparatus which may be simply and inexpensively manufactured for raking, sweeping or otherwise cleaning a specific area at a minimum of time and expense.

Other objects and advantages of this invention will become apparent from the following description taken in connection with the accompanying drawings wherein are set forth by way of illustration and example certain embodiments of this invention.

FIG. 1 is a side elevational view of an apparatus for sweeping or raking various surfaces and embodying the features of this invention.

FIG. 2 is a bottom plan view of the apparatus illustrated in FIG. 1 showing the relative disposition of the raking or sweeping means to the carriage means.

FIG. 3 is a horizontal sectional view on an enlarged scale through a portion of the carriage means of the apparatus taken on the line 1—1 of FIG. 1 illustrating a portion of the means for rotatably driving the raking or sweeping means disposed beneath said carriage means.

FIG. 4 is a horizontal sectional view taken on line 4—4 of FIG. 5 illustrating a roller-tine structure comprising the raking or sweeping means of the apparatus illustrated in FIG. 1.

FIG. 5 is a vertical sectional view taken on line 5—5 of FIG. 4 showing the roller-tine structure.

Referring to the drawings in more detail:

The reference numeral 1 broadly designates an apparatus for grounds care or maintenance which effects a raking or sweeping action of various types of surfaces to effectively clean debris or other material from said surfaces in a rapid efficient manner. The apparatus 1 is generally comprised of a carriage assembly 2 adapted for movement along selected paths with a pair of raking or sweeping means 4 and 6 operatively connected thereto for moving sweeped or raked material laterally of the apparatus 1 for disposition of said material in spaced windrows on opposed sides of said path. The raking or sweeping means 4 and 6 are each angularly disposed relative to the path of travel of the carriage assembly 2 to effect a forward lateral movement of the material from the path with said raking or sweeping means 4 and 6 cleaning overlapping swaths along said path for complete removal of material from the path and disposition of said material in windrows along said path.

The carriage assembly 2 is primarily comprised of a vehicular frame structure 8 and illustrated herein as having a pair of rearwardly located rotatably driven traction wheels 10 and 12 operatively connected to the frame structure 8 by suitable means to provide the driving traction for the movement of the apparatus 1 along selected paths. The carriage assembly 2 also includes a forwardly located wheel 14 adapted for steering the apparatus 1. The wheel 14 is connected to a rotatable shaft 16 by suitable means, said shaft 16 extending through a sleeve member 18 supported on frame 8 by diagonal braces 20. The rotatable shaft 16 has mounted thereon a steering assembly 22 for effecting the rotation of the shaft 16 in the sleeve member 18 for varying the directional movement of the apparatus 1.

The carriage assembly 2 includes a prime mover or engine 24 suitably connected to the frame member 8 for driving the rear traction wheels 10 and 12 and the rotatable raking or sweeping means 4 and 6. The engine 24 includes a driving shaft 26 operatively connected to a pulley belt drive 27 for driving a sprocket wheel. The sprocket wheel 28 is operatively connected to a second sprocket wheel 32 by a chain 30, said wheel 32 being connected to a drive axle 34 interconnecting the rear traction wheels 10 and 12 with the drive axle 34 carried by the frame 8. The apparatus 1 includes an operating lever 36 located forwardly of the operator's station 38 for effecting the engagement or disengagement of the pulley belt drive 27 with the sprocket wheel 28 to effect or stop respectively the movement of the apparatus 1.

Referring to FIG. 2, the rotary rakes or sweepers 4 and 6 are illustrated on the undersurface of frame member 8 with each of said rakes or sweepers 4 and 6 being operatively connected to the frame member 8 by means of a pair of spaced bearing bracket assemblies 40 which rotatably support the opposed end portions 42 of the rakes or sweepers 4 and 6. The raking or sweeping means 4 and 6 are each basically comprised of a carrier 44, illustrated as a cylinder or roller, having a plurality of longitudinally spaced radially extending tines, prongs or teeth 46 operatively connected thereto and positioned for engagement with the surface being cleaned. Each of the carriers 44 of the raking or sweeping means 4 and 6 includes a rotatable shaft 48 suitably connected to the engine 24 for effecting axial rotation of the rollers 44.

The raking or sweeping means 4 and 6 are located beneath the frame 8 and are disposed obliquely to the path of movement of the apparatus 1 for effectively raking or sweeping material to positions lateral of the apparatus 1 for forming windows along the opposed sides of the path of movement of apparatus 1. It should also be noted that the raking or sweeping means 4 and 6 are disposed in a staggered, inset or overlapping fashion transversely of the path of movement of the apparatus 1 such that the swath being cleaned by each of said raking or sweeping means 4 and 6 overlaps the other to insure complete coverage of the area being cleaned. The raking or sweeping means 4 and 6, as illustrated, are each disposed at a 45 degree angle from a longitudinal axis of the apparatus 1 extending through the center of the pivotal steering wheel 14 with the raking or sweeping means 4 being reversely oriented relative to the raking or sweeping means 6 whereby each of said sweeping or making means 4 and 6 are positioned for the movement of material to an opposed side respectively of the apparatus 1. The raking or sweeping means 4 is disposed perpendicularly to the raking and sweeping means 6 and in a rearwardly spaced relation thereto. The forward end 50 of the raking and sweeping means 4 is inset from the forward end portion 42 of the raking and sweeping means 6 to provide the overlapping swaths of cleaned areas.

The raking or sweeping means 6 has a forward end portion 50 located centrally of the apparatus 1 and a rearward end portion 52 located in a rearwardly spaced relation from the end portion 50 and laterally disposed to the side 51 of the frame member 8. The raking or sweeping means 4 includes a forward end portion 54, as illustrated, rearwardly spaced from the forward end portion 50 of the raking or sweeping means 6 and inset toward the mid portion 56 of the raking or sweeping means 6. The raking and sweeping means 4 further includes a rearward end portion 58 located rearwardly of the forward end portion 54 and laterally offset therefrom in an outward manner toward the side 60 of frame member 8 opposite the side 51 of frame 8 which corresponds with the end portion 52 of the raking or sweeping means 6.

The driven shafts 48 of each of the raking or sweeping means 4 and 6 have a double pulley 62 operatively connected thereto and disposed in spaced cooperative relation from a double pulley 64 for retaining a pair of drive belts 66 to impart rotation motion to the drive shafts 48. The pulleys 64 associated with each of the raking or sweeping means 4 and 6 are operatively connected to a carrier drive system designated by the reference numeral 68 and generally comprised of a pair of drive shafts 70 and 72 operatively connected to a gear box 74 and driven by means of a pulley belt drive system 76 operatively connected to the engine 24. The drive shaft 70, as illustrated, is connected directly to the pulley 64 associated with the raking or sweeping means 4 with the drive shaft 72 being connected to the pulley 64 associated with the raking or sweeping means 6 through a plurality of rotatable linkages.

The rotatable drive shaft 72, which is rotatably supported in a bearing bracket assembly 76, is operatively connected to a block bearing assembly 78 by means of a universal joint 80. The opposed end of the block bearing assembly 78 is operatively connected to a drive shaft 82 by means of a second universal joint 84 for imparting a rotational driving force to the drive shaft 82 which is rotatably supported on the frame 8 by means of a pair of bracket bearing assemblies 86. The pulley 64 associated with the raking or sweeping means 6 is mounted on the end portion of the drive shaft 82 and is responsive to the rotation of the drive shaft 82 to drive the belt 66. Each of the pulley belt systems to the respective raking or sweeping means 4 or 6 includes a double spring loaded belt tightening pulley 88 adjustably mounted on the frame member 8 and positioned in a conventional manner for maintaining the desired tension on the belts 66 of the respective systems.

The pulley belt drive 76 from the engine 24 for driving the respective drive shafts 70 and 72 through the gear box, as illustrated, is comprised of a horizontally disposed pulley 90 operatively connected to a vertical shaft 92. The shaft 92 is designed for engagement of conventional means in the gear box 74 for imparting a driving force to the drive shaft 70 and 72. The pulley 90 is operatively connected to a pulley 94 mounted to a shaft 96 on the motor 24 by means of a belt 98 having a half twist and positioned by means of a guide pulley 100. The guide pulley 100 is movable by activation of a hand lever 102 for tensioning the drive belt 98 to rotatably drive the pulley 90 thereby providing a conventional clutch system.

Referring to FIG. 5, the roller member of the raking or sweeping means 4 and 6 is comprised of a pair of opposed channel-shaped members 106, each of said members 106 having a base portion 108 and opposed spaced leg members 110 operatively connected to said base member 108 and extending outwardly therefrom, the leg members 110 terminating in outwardly extending flanges 112. The flanges 112 of opposed channel members 106 are placed in contacting relation and secured together by means of bolt-nut assemblies 114 to form the carrier 44.

The legs 110 and base member 108 of the channel-shaped members 106 each define a row of longitudinally spaced apertures therethrough providing communication between the exterior and the inner chamber 116 defined by the channel-shaped members 106 within the carrier 44. The apertures 115 in the carrier 44 are disposed in spaced longitudinally extending rows with the rows of adjacent sides of the six-sided carrier 44 having apertures 115 in staggered formation or longitudinally offset from corresponding apertures in adjacent rows. In this manner, by longitudinally offsetting the rows of tines, complete coverage of the surface to be cleaned may be obtained with a minimum of tines.

The tines 46 each have an outer end portion 120 which is bent along a radial plane through said carrier 44 in a direction reverse to the direction of rotation of the carrier 44 when in operation on the apparatus 1. In this manner, the tine end portion 120 will tend to slide across the surface being cleaned as opposed to digging into the surface and will, due to the orientation of the raking means 4 and 6, slide forwardly and laterally across the surface thereby effectively cleaning the surface. The tines 46 each include a base portion 122 which extends through the aperture 115 in the roller member 44 and may be operatively connected to the roller member at that point as by welding or other suitable means.

The tines 46 are constructed in pairs from a U-shaped member having a cross member 124 and a pair of opposed spaced leg members 126 integrally formed with the cross member 124 at opposed ends thereof. Each of the leg members 126 form the tines 46 with the base portions 122 and outer bend end portions 120. The cross member 124 provides stability for the tine construction and enables one to merely weld the base portion 122 of the legs 126 to the roller or a portion of the cross member 124 and maintain the tines 46 in the relative position to the carrier 44. Were the cross member 124 not employed, a considerably different and more expensive roller structure would be required in order to obtain the proper connection of the tines 46 to the carrier 44. The cross member 124, therefore, tends to retain the tines 46 in their proper position relative to the carrier 44 providing an exceptionally strong durable roller tine structure at a minimum of expense.

As illustrated in FIG. 5, the carrier 44 is operatively connected to the driven shaft 48 by means of a plurality of retaining bolts 130, said bolts 130 being disposed through bores 132 in the shaft 48 to retain the carrier 44 in the desired position on the shaft 48 and to impart the driving force from the rotating shaft 48 to the carrier 44. Each of the shafts 48 of the raking or sweeping means 4 and 6 is received at its opposed end portions in bracket bearing assemblies 40 which include a bracket or frame member 134 and self-aligning bearing assemblies 136 with a bearing holder 138.

The bracket 40, as illustrated, is comprised of a pair of upright guide members 140 and 142, illustrated herein as angle irons with their apex portion directed outwardly with the opposed side walls of the opposed angle irons forming guide surfaces to slidably retain the bearing holder 138 in the desired position. The guide members 140 and 142 are each welded to a portion of the frame 8 to retain the bracket assembly 40 in the desired position. A pair of cross brace members mounted in opposed relation above and below the bearing holder 138 to limit the vertical movement of the bearing holder 138 are designated herein as cross braces 144 and 146. The bearing holders 138 are each springingly mounted to frame 8 by means of a threaded tension rod 148 which is operatively connected to a coil spring 150, said coil spring 150 being operatively connected to the frame 8. The threaded tension rod 148 has a nut and washer assembly 152 threadingly engaged thereon for varying the tension of the spring member 150. In this manner, the raking or sweeping means 4 and 6 are springingly mounted to the framework 8 to allow vertical movement of the raking o rsweeping means 4 and 6 upon engagement with irregular ground surfaces or the like.

In operation, the apparatus 1 is directed across a surface to be swept or raked having debris or other material which must be moved into concentrated areas for pickup and disposal. The apparatus 1, as it moves along the surface, drives the carriers 44 forwardly in a clockwise fashion allowing the tines 46 to engage the ground surface effecting a sweeping action forwardly and laterally of the apparatus 1 to move the debris or other material into windrows along opposed sides of the path of travel of the apparatus 1.

As the raking and sweeping means 4 and 6 are each oriented obliquely to the path of travel of the apparatus 1, the material being moved is propelled from beneath the apparatus 1 and laterally of the apparatus 1 in a direction depending upon the angular orientation of the rollers 44. The raking or sweeping means 4 and 6 each have portions which are disposed in a transversely overlapping fashion such that each of the raking or sweeping means 4 and 6 clean an area overlapping the cleaning area of the other such that the entire surface beneath the apparatus 1 is effectively cleaned by a single pass of the apparatus across the surface.

Due to the oblique orientation of the carriers 44 and the forward movement of the carriage 2, the tines 46 engages the surface being cleaned with both a forward and oblique component of force providing a laterally sliding movement of the tines 46 across the ground surface effectively cleaning the surface of debris and other material contained thereon. The directional bend of the individual tines in a reverse manner to that of the direction of rotation allows each of the tines to be self-cleaned, preventing the accumulation of debris or other material on the tines effecting costly stoppages to free such material. In this manner, a large area may be efficiently cleaned by concentrating the debris or other material on the surface into windrows disposed alterally of the path of travel of the apparatus 1 allowing such concentrations to be easily gathered and disposed.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. A grounds care apparatus comprising:
(a) a carriage means adapted for movement along selected paths,
(b) a first rake means operatively connected to said carriage means and adapted for rotary motion, said rake means including a plurality of radially mounted rake tines adapted to effect a sweeping action of material, said rake means being disposed obliquely to said path of movement with a forward end portion disposed in the center portion of said path and the sweeping action of the tines moves material in a first portion of said path laterally of said rake means upon movement of said carriage along said path,
(c) a second rake means operatively connected to said carriage and adapted for rotary motion, said second rake means including a plurality of radially mounted rake tines adapted to effect a sweeping action of material, said second rake means being disposed obliquely to said path of movement and extending across said path in an opposite manner to said first rake means, said second rake means having a forward end portion disposed in said center portion of the path and rearwardly spaced from the forward end portion of the first rotary rake means, said second rake means overlapping said first portion of said path and adapted for the sweeping action of the tines to move material from a second portion of said path laterally of said second rake means upon movement of said carriage means along said path,
(d) said first rake means being obliquely to said path at an angle of approximately 45° and the second rake means extending generally perpendicular to said first rake means, (e) means on said carriage means and operatively connected to said first and second rake means for rotatably driving said rake means.

2. A grounds care apparatus comprising:

(a) a carriage means adapted for movement along selected paths, and including a frame, a pair of driven wheels operatively connected to a rearward portion of said frame, a forward wheel operatively connected to the forward portion of said frame and located centrally of said path, means operatively connected to said forward wheels for controlling its directional orientation for steering the carriage means, means on said frame and operatively connected to said driven wheels for driving said wheels to propel said carriage, (b) a first rake means operatively connected to said carriage means and adapted for rotary motion, said rake means including a plurality of radially mounted rake tines adapted to effect a sweeping action of material, said rake means being disposed obliquely to said path of movement with a forward end portion disposed in the center portion of said path and the sweeping action of the tines moves material in a first portion of said path laterally of said rake means upon movement of said carriage along said path, (c) a second rake means operatively connected to said carriage and adapted for rotary motion, said second rake means including a plurality of radially mounted rake tines adapted to effect a sweeping action of material, said second rake means being disposed obliquely to said path of movement and extending across said path in an opposite manner to said first rake means, said second rake means having a forward end portion disposed in said center portion of the path and rearwardly spaced from the forward end portion of the first rotary rake means, said second rake means overlapping said first portion of said path and adapted for the sweeping action of the tines to move material from a second portion of said path laterally of said second rake means upon movement of said carriage means along said path, (d) means on said carriage means and operatively connected to said first and second rake means for rotatably driving said rake means.

3. A grounds care apparatus as set forth in claim 1 wherein each of the first and second rake means include elongate carriers having a wall defining a longitudinally extending shell with the plurality of raking tines extending through the shell and outwardly thereof with the outer end portions of each being bent rearwardly of the direction of rotation of said carrier means, said tines being longitudinally spaced in rows with the rows circumferentially spaced on said carrier.

References Cited

UNITED STATES PATENTS

| | | | |
|---|---|---|---|
| 1,846,507 | 2/1932 | Boring | 56—27 |
| 1,877,770 | 9/1932 | Larson | 56—27 |
| 2,597,828 | 5/1952 | Spurlin | 56—377 |
| 2,635,411 | 4/1953 | Hicks | 56—377 |
| 2,680,343 | 6/1954 | Enos | 56—377 |
| 2,909,023 | 10/1959 | Van der Lely et al. | 56—377 |
| 2,955,403 | 10/1960 | McKee | 56—27 |
| 2,989,833 | 6/1961 | Defino | 56—27 |
| 3,069,834 | 12/1962 | Spindler | 56—377 |

RUSSELL R. KINSEY, *Primary Examiner.*

U.S. Cl. X.R.

56—377